(12) United States Patent
Craske (10) Patent No.: US 7,673,187 B2
(45) Date of Patent: Mar. 2, 2010

(54) DATA PROCESSING APPARATUS AND METHOD FOR REDUCING TRACE BANDWIDTH

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 507 days.

(21) Appl. No.: 11/585,334

(22) Filed: Oct. 24, 2006

(65) Prior Publication Data

US 2008/0155353 A1   Jun. 26, 2008

(51) Int. Cl.
*G06F 11/00* (2006.01)
(52) U.S. Cl. ........................................................ 714/45
(58) Field of Classification Search ............... 714/18, 714/25, 27, 28, 30, 32, 34, 37, 39, 45
See application file for complete search history.

(56) References Cited

U.S. PATENT DOCUMENTS

| | | | | |
|---|---|---|---|---|
| 6,732,307 B1 * | 5/2004 | Edwards | ................... | 714/724 |
| 7,209,058 B2 * | 4/2007 | Swoboda | ................... | 341/63 |
| 7,249,288 B2 * | 7/2007 | Peled et al. | ................... | 714/47 |
| 7,463,653 B2 * | 12/2008 | Swoboda et al. | ............ | 370/503 |
| 2005/0022068 A1 * | 1/2005 | Billeci et al. | ................... | 714/45 |
| 2006/0267815 A1 * | 11/2006 | Swoboda | ................... | 341/139 |
| 2006/0282719 A1 * | 12/2006 | Damodaran | ................ | 714/718 |
| 2007/0283133 A1 * | 12/2007 | Williams et al. | ............ | 712/227 |

* cited by examiner

*Primary Examiner*—Nadeem Iqbal
(74) *Attorney, Agent, or Firm*—Nixon & Vanderhye P.C.

(57) ABSTRACT

A data processing apparatus and method are provided for reducing trace bandwidth. The data processing apparatus comprises logic for producing data elements, and trace logic for producing a stream of trace elements representative of at least some of the data elements. The trace logic has trace generation logic for generating trace elements for inclusion in the stream, the trace generation logic including compression logic for performing a compression process on at least some trace elements prior to inclusion in the stream. A storage is also provided in association with the trace logic for providing control information which is dependent on an operating environment of the logic producing the data elements. The trace generation logic is arranged to reference that control information in order to adapt the compression process performed by the compression logic having regard to the operating environment. By such an approach, the efficiency of the compression process can be maintained irrespective of the operating environment of the logic producing the data elements.

17 Claims, 9 Drawing Sheets

DATA PROCESSING APPARATUS AND METHOD FOR REDUCING TRACE BANDWIDTH

TECHNICAL FIELD

The present invention relates to a data processing apparatus and method for reducing trace bandwidth.

BACKGROUND

Tracing the activity of a data processing system whereby a stream of trace elements is generated including data representing the step-by-step activity within the system is a highly useful tool in system development. However, with the general move towards more deeply embedded processor cores, it becomes more difficult to track the activities of the processor core or other on-chip devices via externally accessible pins. Accordingly, as well as off-chip tracing mechanisms for capturing and analyzing trace data, increased amounts of tracing functionality are being placed on-chip. An example of such on-chip tracing mechanisms is the Embedded Trace Macrocell (ETM) provided by ARM Limited, Cambridge, England, in association with a variety of their ARM processors.

Such tracing mechanisms produce in real-time a stream of trace elements representing activities of the data processing apparatus that are desired to be traced. This trace stream can then subsequently be analyzed for a variety of purposes, for example to facilitate debugging of sequences of processing instructions being executed by the data processing apparatus, for performing profiling operations in order to determine the performance of particular program code being executed on the data processing apparatus, etc.

Typically, the stream of trace elements that is generated by the trace mechanism is buffered prior to output for subsequent analysis. Such a trace buffer is able to store a finite amount of information and requires a dedicated data bus which has a finite bandwidth over which the elements to be buffered can be received. The trace buffer is generally arranged to store information in a wrap-around manner, i.e. once the trace buffer is full, new data is typically arranged to overwrite the oldest data stored therein. It has been found that the bandwidth of the dedicated data bus limits the rate at which information can be stored in the trace buffer.

Typically, a trace analyzing tool is provided which receives the stream of trace elements from the trace buffer when desired, for example once the trace has completed. The trace analyzing tool can then be used to reconstruct the activities of the device being traced based on the received trace elements. As devices such as processor cores increase in power and complexity, it is clear that the amount of information required to track the activities of such devices will increase, and accordingly there will potentially be a very large volume of trace elements that need to be traced.

However, there is a problem that there is finite bus bandwidth over which the trace elements can be output by the trace logic, and any trace buffer used to buffer such trace elements will have a finite size. Accordingly, the volume of trace elements that can be generated is limited.

The activities of a device that might want to be traced include, but are not limited to, the instructions being executed by a processor core (referred to as instruction trace), and the memory accesses made by those instructions (referred to as data trace). These activities may be individually traced or traced together, so that the data trace can be correlated with the instruction trace. The data trace itself consists of two parts, the memory addresses and the data values, referred to (respectively) as data address and data value trace. Again, the existing trace ETM protocols allow for data address and data value tracing to be enabled independently or simultaneously.

Experience shows that for existing processor cores and ETM protocols, a bit rate of less than 2 bits per instruction is achieved for instruction tracing only. However, to illustrate the above problem, a bit rate of approximately 10 to 16 bits per instruction is achieved for instruction and data address tracing. Therefore a processor having an operating speed of approximately 1 GHz executing one instruction per cycle will generate approximately 10 to 16 Gbits/s of trace data, all of which must be taken off-chip and captured in a fixed-size buffer. In addition to tracing instructions and data addresses, certain classes of problem also require data value tracing to be performed, and this will further increase the amount of trace data that needs to be generated to over 20 bits per instruction. Collectively, the two elements of data tracing, namely the data address tracing and the data value tracing, contribute to a large proportion of the overall volume of trace elements produced.

With the aim of seeking to alleviate the volume of trace that needs to be produced, a number of compression algorithms have been developed for seeking to compress certain trace elements prior to them being output in the trace stream. For example, considering address tracing, there are often periods of time when sequences of addresses follow a predictable pattern. For example, considering instruction tracing, the instruction address is often merely incremented to identify each subsequent instruction being executed. For such incremented addresses, it is not typically necessary to output the instruction address, but instead all that is required is some information indicating that another instruction has executed, and the address can be inferred. However, for instruction flow changing instructions such as branch instructions, these can cause a jump in instruction flow, such that the target address is not merely an incremented version of the branch instruction's address. Hence, when the instruction following the branch instruction is executed, it is often necessary to output sufficient information to identify the address of that instruction, so that it can be determined by trace analyzing logic reviewing the trace stream.

However, it is often not necessary to output the complete address in such situations, and instead compression algorithms can be used that send only the parts of the address that have actually changed from a preceding target address that was traced. In accordance with one particular embodiment, this technique involves working from the least significant portion of the address and iterating up to the most significant portion, until a point is reached where subsequent portions are identical to the ones the trace analyzing tool already knows about as a result of previously traced address information.

Whilst compression algorithms such as those discussed above can yield very effective compression in many situations, there are circumstances in which they do not operate particularly effectively. For example, certain operating systems, such as Linux, use a most significant part of the address as a type qualifier, for example to identify application code, library code, kernel code, etc. Branches will often cause a jump from one type of code to another, and accordingly the above type of compression does not work well, since the most significant portion of the address has changed.

More generally there is an issue that the effectiveness of particular compression algorithms varies dependent on the activities of the logic being traced, and accordingly there will be instances where the provided compression techniques are not very effective, and accordingly give rise to a larger volume of trace than is desirable. In some instances, this may cause the volume of trace data to exceed the available bandwidth, resulting in certain trace information being lost.

Accordingly, it would be desirable to provide an improved technique for generating a stream of trace elements, so as to enable more effective use to be made of the finite bus bandwidth over which the trace elements can be output, and the finite size of any trace buffer in which those trace elements are buffered.

SUMMARY OF THE INVENTION

Viewed from a first aspect, the present invention provides a data processing apparatus, comprising: logic for producing data elements; trace logic for producing a stream of trace elements representative of at least some of said data elements, the trace logic having trace generation logic for generating trace elements for inclusion in the stream, the trace generation logic including compression logic for performing a compression process on at least some trace elements prior to inclusion in the stream; and storage associated with the trace logic for providing control information which is dependent on an operating environment of the logic producing said data elements, the trace generation logic being operable to reference said control information in order to adapt the compression process performed by the compression logic having regard to said operating environment.

Storage is provided in association with the trace logic that provides control information which is dependent on an operating environment of the logic producing the data elements to be traced. This control information is then referenced when performing a compression process so as to adapt that compression process having regard to the operating environment. This hence provides a mechanism whereby the compression process can be adapted to enable efficient compression to be achieved for different operating environments. The storage may be provided within the trace logic, or can be provided external thereto, provided the control information can be accessed by the trace logic.

The data elements received by the trace logic can take a variety of forms provided they give sufficient information for the required stream of trace elements to be generated therefrom. Further, the data elements may be transmitted from the logic (also referred to herein as the traced device) to the trace logic, or alternatively may be retrieved by the trace logic from the traced device. As examples of data elements, the data elements may be an instruction address value, a data address value, a data value, etc. The trace elements generated to represent those data elements can then take a variety of forms provided they provide sufficient information to enable the data elements to be determined by trace analysis logic reviewing the trace stream.

The manner in which the compression process is adapted can take a variety of forms. However, in one embodiment, the compression logic comprises re-ordering logic which is operable, for at least a subset of data elements to be represented by trace elements, to consider each said data element as a series of portions and to re-order said portions dependent on the control information to produce a reordered data element, the trace element being formed by at least a part of the reordered data element, and the compression logic being operable to apply to the trace element a compression algorithm specified by said compression process.

The re-ordering logic is arranged, for at least a subset of the data elements, to considering such data elements as consisting of a series of portions, and to re-order those portions dependent on the control information. The trace element is then derived from the re-ordered data element, with that trace element then being subjected to compression. By enabling a re-ordering of the portions making up particular data elements prior to the compression algorithm being performed, this enables the same basic compression algorithm to be used independent of the operating environment, but for different re-orderings to be performed for different operating environments in order to ensure that the compression algorithm works efficiently.

The operating environment on which the control information depends can take a variety of forms. However, in one embodiment, the relevant part of the operating environment is the operating system used by the logic producing the data elements, and the control information provides a control value which is dependent on the operating system used. Hence, by way of example, the control information can be arranged to cause re-ordering to be performed if one type of operating system is being used, and no re-ordering to take place if another type of operating system is being used. Indeed, in some embodiments, the control information can be set so as to provide different re-orderings for different operating systems.

In one embodiment, the control information may be predetermined, for example because the traced device is always arranged to have the same operating environment, for example the same operating system. The same basic trace logic can hence be produced, and at the time it is coupled with a device to be traced, the control information can be set dependent on the operating environment of that traced device.

However, in an alternative embodiment, the control information is configurable from a source external to the trace logic, such that the source can program the control information. The source can take a variety of forms, but in one embodiment the source is trace analyser logic used to analyse the stream of trace elements produced by the trace logic. Accordingly, based on some knowledge of the operating environment of the traced device, the trace analyser logic can program appropriate control information into the storage, this storage for example taking the form of one or more control registers provided within the trace logic and accessible by the trace analyser logic.

Alternatively, or in addition, a more dynamic configuration of the control information may be facilitated, in which the control information is configurable by the trace logic itself. In such embodiments, the trace logic may be arranged to perform a trace analysis process, and to then re-calculate the control information at determined points dependent on the result of that trace analysis process.

In one particular embodiment, the trace analysis process is a trace profiling process which, for at least a subset of data elements to be represented by trace elements, logs information about which portions of a current data element to be traced differ from corresponding portions of a preceding data element that was traced. This in effect enables weightings to be established over time for particular portions, such that information about the operating environment of the traced logic is established internally within the trace logic by performance of the trace profiling process. Based on a knowledge of which portions tend to change most frequently, a re-ordering can then be performed to, for example, cluster such portions in one area of a re-ordered data element structure to allow a more efficient compression to take place.

The time at which the trace logic decides to re-calculate the control information can be varied dependent on implementation. However, in one embodiment the trace logic is operable periodically to produce sync packets which are inserted in the trace stream, and provide sufficient information to enable data elements to be derived from subsequent trace elements appearing in the trace stream. Hence, even if some trace data is lost, the trace analysing tool can recommence analysis of the trace stream once it has located a sync packet. In accordance with such embodiments, the determined points at which the trace logic re-calculates the control information are points where a sync packet is to be inserted in the trace stream, the trace logic being operable to provide an indication of the re-calculated control information in the sync packet. Hence, in accordance with this embodiment, the sync packet additionally identifies the re-calculated control information, so that the trace analysing tool then knows what re-ordering has taken place in respect of compressed trace elements subsequently appearing in the trace stream.

The data elements on which embodiments of the present invention may be employed can take a variety of forms. However, in one embodiment, at least some of said data elements are addresses, the trace logic is operable to produce a stream of trace elements representative of said addresses, and said at least a subset of data elements which the re-ordering logic produces reordered data elements for are addresses which cannot be implied by a previously issued address. In one particular embodiment, the addresses are instruction addresses, but it will be appreciated that the techniques of embodiments of the present invention may also be applied to data addresses.

In one embodiment, the subset of data elements which the re-ordering logic produces reordered data elements for are target addresses of at least some branch instructions. In one particular embodiment, this subset of data elements may be the target addresses of any branch instructions. However, some branch instructions directly specify the branch address within the opcode of the instruction itself. Typically the trace analysis tool is provided with a copy of the program code being executed, and accordingly from its knowledge of the address of the branch instruction, it can in such situations identify the target address. However, for other branch instructions, also known as indirect branch instructions, the target address is specified with reference to a register identified in the instruction, and accordingly the target address cannot be inferred from the trace analyser tool's copy of the program code. Accordingly, in such embodiments the re-ordering logic can be arranged to perform re-ordering for at least the instruction addresses that are the targets of indirect branch instructions, the actual re-ordering performed (indeed in some embodiments the decision as to whether to re-order or not) being dependent on the control information referenced by the trace logic.

In one embodiment where the operating environment upon which the control information depends is an operating system used by the traced logic, the actual operating system used uses an upper portion of the address to specify a type qualifier. In such embodiments, the re-ordering logic is operable to produce re-ordered data elements in which at least that upper portion is moved to a lower portion, the exact re-arrangement being defined by the control information.

The portions considered to make up each data element can contain an arbitrary number of bits, dependent on implementation. However, in one embodiment, each portion of the data element comprises either a byte, nibble or bit. In some embodiments, the portions making up a data element may not all be of the same size. Further, in some embodiments the reordering process may be restricted to only a part of the data element, for example the portions in the upper half word of the data element.

Viewed from a second aspect, the present invention provides trace logic for generating a stream of trace elements representative of at least some data elements produced by logic of a data processing apparatus, said trace logic comprising: trace generation logic for generating trace elements for inclusion in the stream; compression logic for performing a compression process on at least some trace elements prior to inclusion in the stream; and storage for providing control information which is dependent on an operating environment of the logic producing said data elements, the compression logic being operable to reference said control information in order to adapt the compression process performed having regard to said operating environment.

Viewed from a third aspect, the present invention provides a trace analysing apparatus for analysing a stream of trace elements generated by a data processing apparatus in accordance with the first aspect of the present invention, comprising: storage for storing current control information which is dependent on an operating environment of the logic producing said data elements; and trace re-ordering logic operable on receipt of a compressed trace element in said stream to reference said current control information during a decompression process in order to determine the data element represented by that compressed trace element.

Viewed from a fourth aspect, the present invention provides a method of operating a data processing system, comprising the steps of: producing data elements; employing trace logic to receive indications of said data elements, and to produce a stream of trace elements representative of at least some of said data elements; providing control information which is dependent on an operating environment of the logic producing said data elements; and performing a compression process on at least some trace elements prior to inclusion in the stream, during which said control information is referenced in order to adapt the compression process performed having regard to said operating environment.

Viewed from a fifth aspect, the present invention provides a computer program product comprising a computer program operable to cause a computer to analyse a stream of trace elements generated by the method of the fourth aspect of the present invention by performing the steps of: storing current control information which is dependent on an operating environment of the logic producing said data elements; and on receipt of a compressed trace element in said stream, referencing said current control information during a decompression process in order to determine the data element represented by that compressed trace element.

DETAILED DESCRIPTION OF EMBODIMENTS

Figure 1:
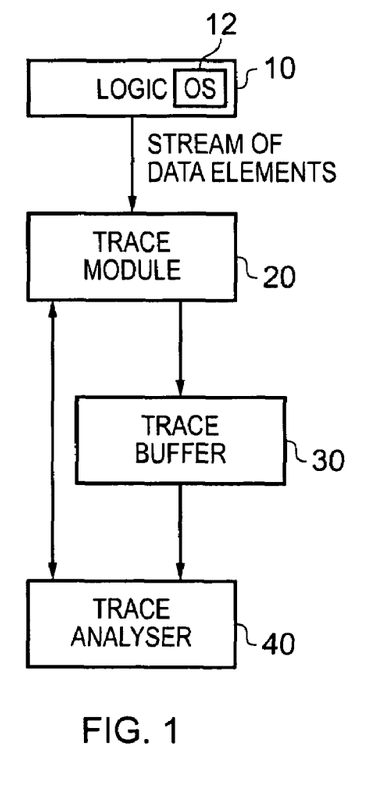
FIG. 1 is a block diagram of a data processing system is accordance with one example embodiment.

FIG. 1 schematically illustrates a data processing system providing logic 10, a trace module 20, a trace buffer 30 and a trace analyser 40. Whilst FIG. 1 illustrates a data processing system providing a trace buffer 30, in alternative embodiments the trace module 20 may pass its output straight to the trace analyser 40, without going via a trace buffer.

The logic 10 producing the stream of data elements received by the trace module 20 can take a variety of forms, and may for example be a processor core, a Direct Memory Access (DMA) engine, a data engine/accelerator, etc. Alternatively, the logic 10 may consist of a plurality of devices coupled by a bus, and the data elements may be monitored by the trace module 20 as they pass over the bus.

The trace analyser 40, which may in one embodiment be formed by a general purpose computer running appropriate software, is coupled to the trace module 20 and the trace buffer 30. The trace module 20, typically embodied on-chip, is arranged to receive data elements from logic 10 and dependent thereon produces a stream of trace elements which are stored in the trace buffer 30 (which may be provided on or off chip). The trace analyser 40, typically embodied off-chip, is then used to analyse that stream of trace elements in order to derive information indicative of the activities of the logic being traced 10. In particular, through analysis of the stream of trace elements, the detailed activity of the logic 10 can be determined.

The trace analyser 40 is connected to the trace module 20 to enable certain features of the trace module to be controlled by the user of the trace analyser. Additionally, in some embodiments, the stream of trace elements produced by the trace module 20 may be provided directly to the trace analyser 40 rather than being buffered in the trace buffer 30.

Figure 2:
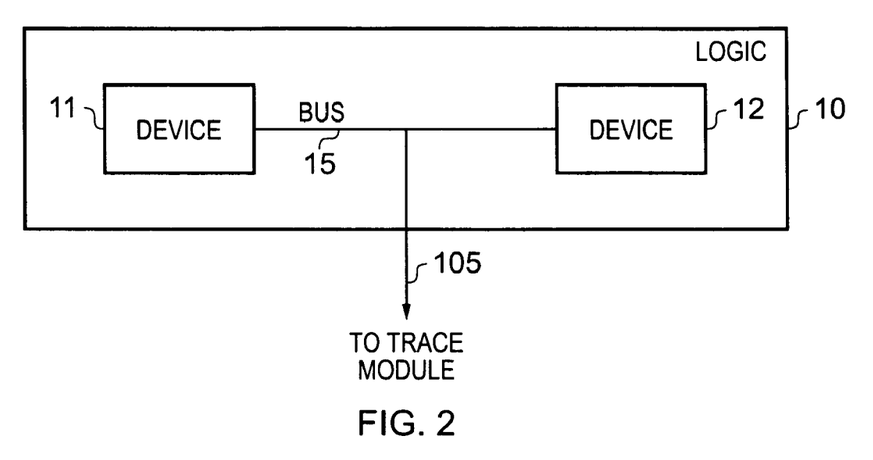
FIG. 2 is a block diagram illustrating an example of the logic block of FIG. 1 in accordance with one embodiment.

FIG. 2 is a block diagram of an example of the logic 10 of FIG. 1. In this example the logic 10 comprises two devices 11, 12 connected by a bus 15. The bus is linked to the trace module 20, via connection 105, over which data elements produced by the logic are passed.

Figure 3:
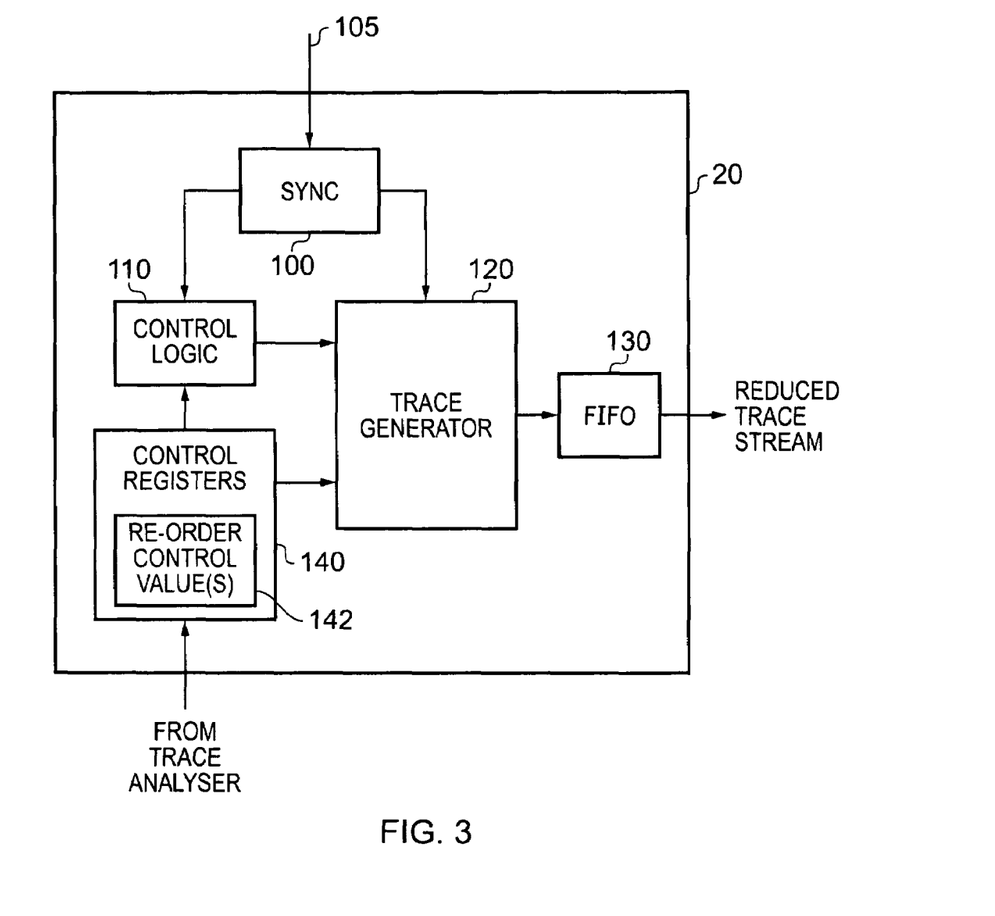
FIG. 3 is a block diagram illustrating in more detail the on-chip trace module of FIG. 1 in accordance with one embodiment.

FIG. 3 is a block diagram of the trace module 20 in accordance with one embodiment. The trace module 20 is arranged to receive over path 105 data elements indicative of the state or operation of the logic being traced. The sync logic 100 is arranged to convert the incoming signals into internal versions of the signals more appropriate for use within the trace module 20. These internal versions are then sent to the control logic 110 and the trace generation logic 120, although it will be appreciated that the control logic 110 and the trace generation 120 will not necessarily need to receive the same signals. Fundamentally, the control logic 110 needs to receive data relating to triggerable events, for example instruction addresses, data values, register accesses, etc so that it can determine whether trace should be activated, and what types of data elements should be traced. It then issues appropriate control signals to the trace generation logic 120 to cause the required trace elements to be generated by the trace generation logic 120. The trace generation logic 120 receives via the sync logic 100 any data that would need to be traced dependent on the control signals issued by the control logic 110.

In accordance with example embodiments, control registers 140 are provided which are used to configure the operation of the control logic 110, these control registers 140 being settable from the trace analyser 40. A number of control registers can be provided, which fundamentally direct two elements of the trace generation logic operation—"when" to generate trace elements, e.g. when a particular range of addresses is accessed, and "what" to generate those trace elements for, e.g. the data address and/or data value of a particular transfer and, typically, supplementary information about the transfer such as whether it is a read or a write operation, whether it is locked, security information etc.

Triggered by a control signal issued by the control logic 110 that a "when" condition is met, the trace generation logic 120 generates the required trace elements indicative of the data elements it is receiving from the sync logic 100, in accordance with the associated "what" signal it also receives from the control logic. These generated trace elements are output to the FIFO 130. From here, the trace stream is then output to the trace buffer 30, or in alternative embodiments is output directly to the trace analyser 40.

In accordance with example embodiments, one or more of the control registers 140 are arranged to store control information which is dependent on an operating environment of the logic 10 producing the stream of data elements. In particular, in one embodiment, the aspect of the operating environment which determines the control information is the operating system 12 being used by the logic 10. The trace generator 120 is arranged for at least some of the trace elements it generates to perform a compression process prior to inclusion of those trace elements in the stream. In accordance with example embodiments, the above mentioned control information is referenced by the trace generator 120 in order to adapt the compression process performed, with the aim of ensuring an efficient compression having regard to the operating system being used by the logic 10.

In one particular embodiment, a single bit value is provided in one of the control registers 140 which can be set by the trace analyser 40 to identify the required control information. If the relevant bit has a first logic value, this indicates to the trace generator 120 that no adaptation of the compression process is required, whereas if the bit has a second value, this indicates to the trace generator that the compression process should be adapted in some predetermined manner.

In one example embodiment, the compression process performed by the trace generator 120 can be adapted to selectively include an initial re-ordering step. If the control bit indicates that no adaptation is required, then no re-ordering step is performed, whereas if the control bit indicates that an adaptation is required, then an initial re-ordering step is performed in order to re-order portions of a data element needing to be traced such that the trace element is then derived from the re-ordered data element in a manner that facilitates more efficient compression.

One particular example implementation of this approach is where the compression algorithm used by the trace generator 120 when performing instruction tracing is based on outputting only the portions of the instruction address that have actually changed since the last instruction address was traced. Such an approach can be based on working from the least significant portion of the address and iterating up to the most significant portion, until a point is reached where subsequent portions would be identical to the ones the trace analysing tool already knows about from the previously traced instruction address. The portions into which each instruction address are partitioned can be of arbitrary length, but in one embodiment comprise a nibble, i.e. four bits.

Whilst the above approach can work well in many situations, certain operating systems, such as Linux, typically use the most significant nibble as a type qualifier. Hence, by way of example, applications running in the Linux operating system on a processor core such as an ARM processor core developed by ARM Limited, Cambridge, United Kingdom, may have application code executing at 0x0*****, branching to library code at 0x4***, which may potentially make system calls into the vectors at 0xF***, which may then enter the kernel itself at 0xC***, which may then return to the library at 0x4***, and which finally may then return to the application code at 0x0*****. Each of these transitions will typically occur via a branch instruction, and because the target address of the branch instruction may not be derivable by the trace analysing tool, it will typically be necessary to trace the instruction addresses at each of these branch targets. However, using the above compression scheme, it will be seen that a very inefficient compression will be achieved, since the most significant nibble of each target address differs from the most significant nibble of the previously traced target address, thereby requiring all nibbles to be traced each time. It is rare for code in any of these segments to be more than a few megabytes in length, and hence nibbles 6, 5, 4 and 3 typically change less frequently than nibble 7 (i.e. the most significant nibble). This hence typically results in unnecessary sending (and bandwidth usage) of the frequently static nibbles 3, 4, 5 and 6.

However, by using the techniques described using non-limiting embodiments, if the trace analyser knows that the traced device is using an operating system such as Linux, it can set a control bit within control registers 140 to cause the trace generator to perform some re-ordering prior to compression. In particular, the trace generator can be arranged when the control bit is set to perform a re-ordering of the nibbles of the instruction address so as to move the most significant nibble to a lower, less significant position in the re-ordered data element. In the above example, the nibbles 6, 5, 4 and 3 can then form the most significant nibbles, with nibble 7 following nibble 3, and thereafter followed by nibbles 2, 1 and 0.

It will be appreciated that the above-described embodiment, where a single bit value is provided within the control register which is settable by the trace analyser in order to switch re-ordering on or off, is merely one example of how the described techniques may be applied. In alternative embodiments, the relevant control information within the control registers may comprise more than a single bit, and may for example identify the particular re-ordering to be performed. Again, such control information may be programmable from the trace analyser 40. However, alternatively, or in addition, some dynamic reconfiguration of the relevant control information in the control registers 140 can be performed by the trace generator 120 itself, based for example on a profiling process performed by the trace generator 120, as will be described in more detail later.

In embodiments such as illustrated in FIG. 2 where the logic producing the stream of data elements may comprise multiple devices, the control information specified in the control register 140 may be provided on a per device basis. The data elements in the trace stream would identify which of the devices has produced them, and based on this information the trace generator can decide with reference to the relevant control information how, if at all, to adapt the compression process to be applied in respect of each data element. However, this will not be necessary for all such multi-device systems. For example, for a symmetric multi-processing (SMP) system, it would be likely that all processors will run the same operating system, and thus in such a system the reordering rules could be applied globally in respect of the data elements produced by all processors.

Figure 4:
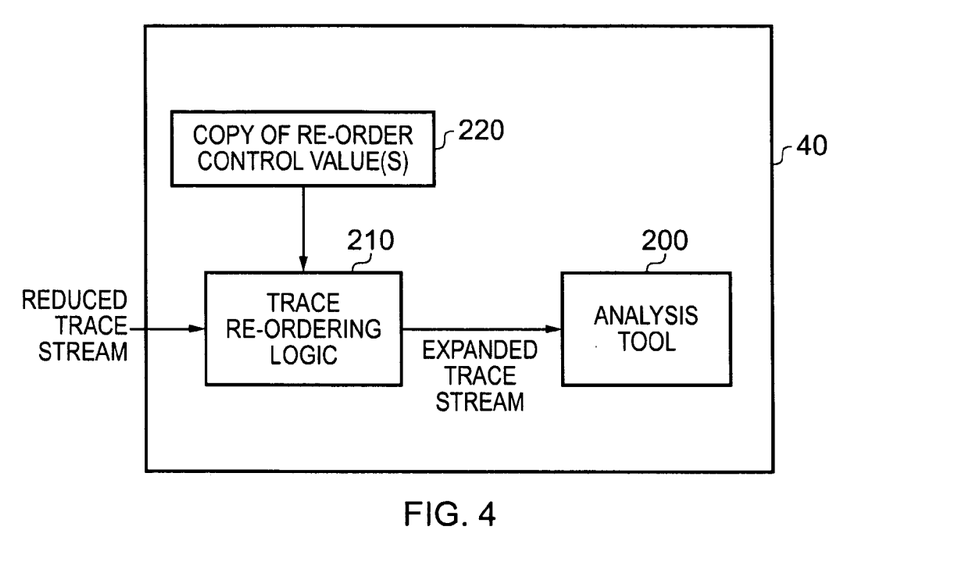
FIG. 4 is a block diagram illustrating components provided within the trace analyser 40 of FIG. 1 in accordance with one embodiment.

FIG. 4 is a block diagram illustrating components provided within the trace analysing tool 40 in accordance with one example embodiment, in order to decompress a trace stream where trace elements have been compressed in the above-described manner. As shown in FIG. 4, a register 220 is provided in which a copy of the re-order control values 142 stored in the control register 140 are maintained. As an alternative to maintaining this copy, the trace re-ordering logic 210 may be provided with direct access to the relevant control registers 140 within the trace logic 20 as and when required to decompress the trace stream received from the trace logic 20.

The trace stream received from the trace logic is referred to as a reduced trace stream, since through use of the above-described re-ordering techniques, more efficient compression can be achieved by taking into account the operating system being used by the device being traced. When the trace re-ordering logic 210 receives a compressed trace element in the trace stream that has been compressed by the trace generator 120 dependent on the control information stored in the control registers 140 as described earlier, then it is arranged to reference the copy of the re-order control values 220 whilst decompressing that trace element in order to determine the data element represented by that compressed trace element, with that decompressed information being included within the expanded trace stream then forwarded to the analysis tool 200. The analysis tool 200 then performs any required analysis on the expanded trace stream.

Whilst in FIG. 4 the analysis tool 200 and the trace re-ordering logic 210 are shown as separate elements so as to illustrate the extra functionality performed in accordance with techniques of embodiments of the present invention, it will be appreciated that in some embodiments these two logic blocks can be combined. Indeed it is also possible that some of the processing performed by the analysis tool 200 can be performed prior to the operation performed by the trace re-ordering logic, for example any trace analysis that does not require full details of the data element represented by the compressed trace element.

It will also be appreciated that at least some of the functions performed by the analysis tool 200 and the trace re-ordering logic 210 can be performed by appropriate software executing on a computer forming the trace analyser 40.

Figure 5:
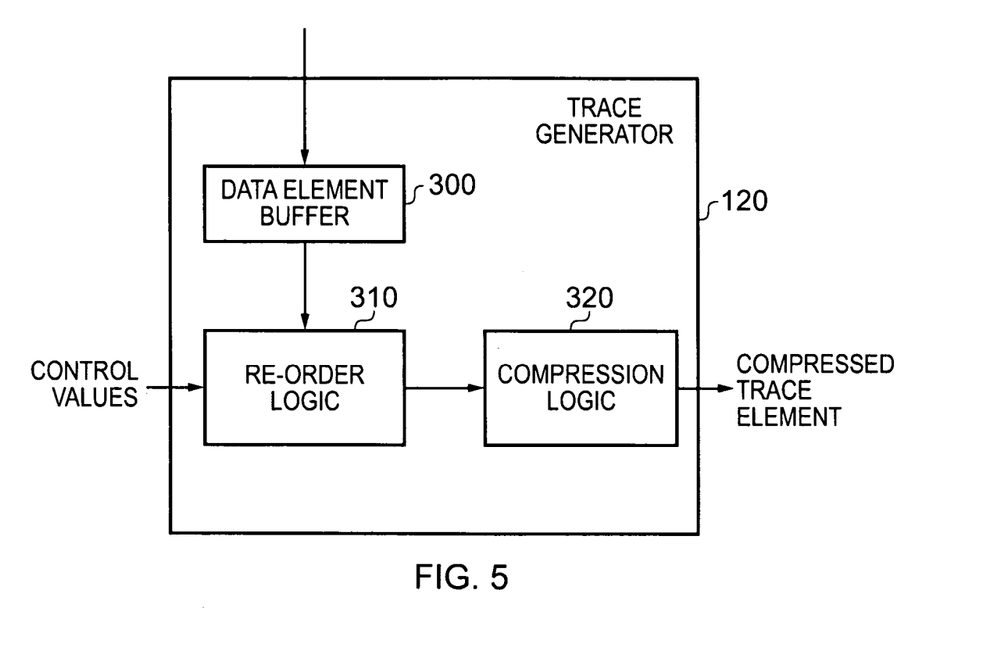
FIG. 5 is a block diagram illustrating in more detail components provided within the trace generator 120 of FIG. 3 in accordance with one embodiment.

FIG. 5 is a diagram schematically illustrating some of the components provided within the trace generator 120 in order to perform the compression of example embodiments. In particular, as shown in FIG. 5, a data element buffer 300 is provided within the trace generator 120 for buffering data elements of the type that are to be subjected to the selective re-ordering and compression of embodiments of the present invention. These data elements may take a variety of forms, for example instruction addresses, data addresses, or indeed data values. However, in one embodiment, the data elements stored in the buffer 300 are instruction addresses, and in particular instruction addresses that cannot be inferred by the trace analysis tool merely from an indication that an instruction has executed.

It will be appreciated that for many pieces of code, a large number of instructions are merely executed in order, and accordingly if the trace analysis tool has an indication of an address for a particular instruction, then any subsequent instructions executing in order can have their address determined by the trace analysis logic without that address actually needing to be traced. All that is required is an indication that an instruction has executed.

However, if an instruction flow changing instruction, such as a branch instruction, is encountered, then this will cause a discontinuous jump in the instruction flow, such that the target address (i.e. the address of the next instruction to be executed) cannot necessarily be determined by the trace analyser 40 without details of that address being traced. In one embodiment, whenever a branch instruction is executed, then for the instruction at the target address, that target instruction address is routed to the trace generator 120 in order for an associated trace element to be produced, and such target addresses are placed within the data element buffer 300. In an alternative embodiment, only those target addresses for indirect branch instructions (i.e. those branch instructions where the target address is not specified directly within the instruction encoding, but instead is identified with reference to a register) are placed within the data element buffer 300.

Each instruction address stored in the data element buffer 300 is passed to the re-order logic 310, which dependent on control values received from the control register 140 determines whether to perform re-ordering prior to compression, and if so what re-ordering to perform. In one simple embodiment, the control value merely indicates whether re-ordering should take place or not, and if it is to take place, the actual re-ordering is predetermined. However, as mentioned earlier, in alternative embodiments the control values may specify not only the fact that re-ordering should be performed, but may also identify the re-ordering required.

The re-order logic then re-orders the data portions of the data element received from the buffer 300 as dictated by the control values, and outputs the resultant re-ordered data element to the compression logic 320, where a compression algorithm is applied. In one particular embodiment, the compression algorithm involves a leading zero removal process followed by some further compression, as a result of which a compressed trace element is output for including in the trace stream.

Figure 6:
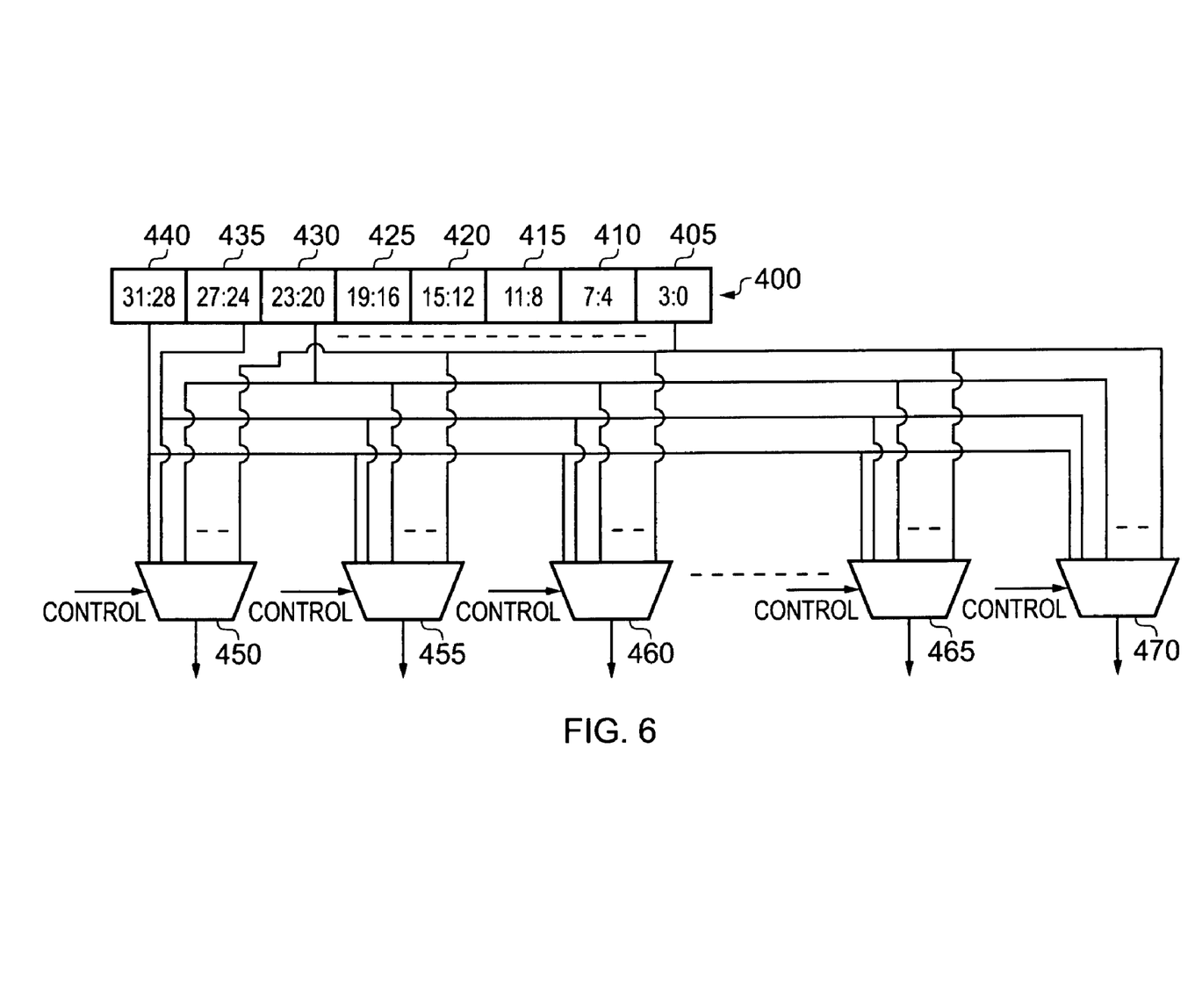
FIG. 6 is a block diagram illustrating one embodiment of the re-order logic of FIG. 5.

FIG. 6 is a block diagram illustrating in more detail the re-order logic 310 of FIG. 5 in accordance with one embodiment. As can be seen, each instruction address 400 is arranged to consist of a number of nibbles. In the example embodiment, the instructions are 32-bit instructions, and accordingly eight nibbles 405 to 440 are provided. Each of these eight nibbles are provided as inputs to eight multiplexers 450, 455, 460, 465, 470 (for simplicity, three of the multiplexers have been omitted from the figure). A control input is then provided to each multiplexer, which is derived from the control information stored in the control registers 140.

If no re-ordering is required, it will be appreciated that multiplexer 450 will merely be driven to output nibble 440, multiplexer 455 will be driven to output nibble 435, multiplexer 460 will be driven to output nibble 430, etc. However, if re-ordering is required, then a different set of control inputs will be provided to cause a re-arrangement of the nibble ordering of the data element. Considering the earlier example of the Linux operating system, where the most significant nibble 440 is used as a type identifier, in such situations the control signals provided to the multiplexers will cause the nibble 440 to be output at a less significant nibble position and instead multiplexer 450 may be driven to output nibble 435, multiplexer 455 may be driven to output nibble 430, multiplexer 460 may be driven to output nibble 425, etc.

Figure 7:
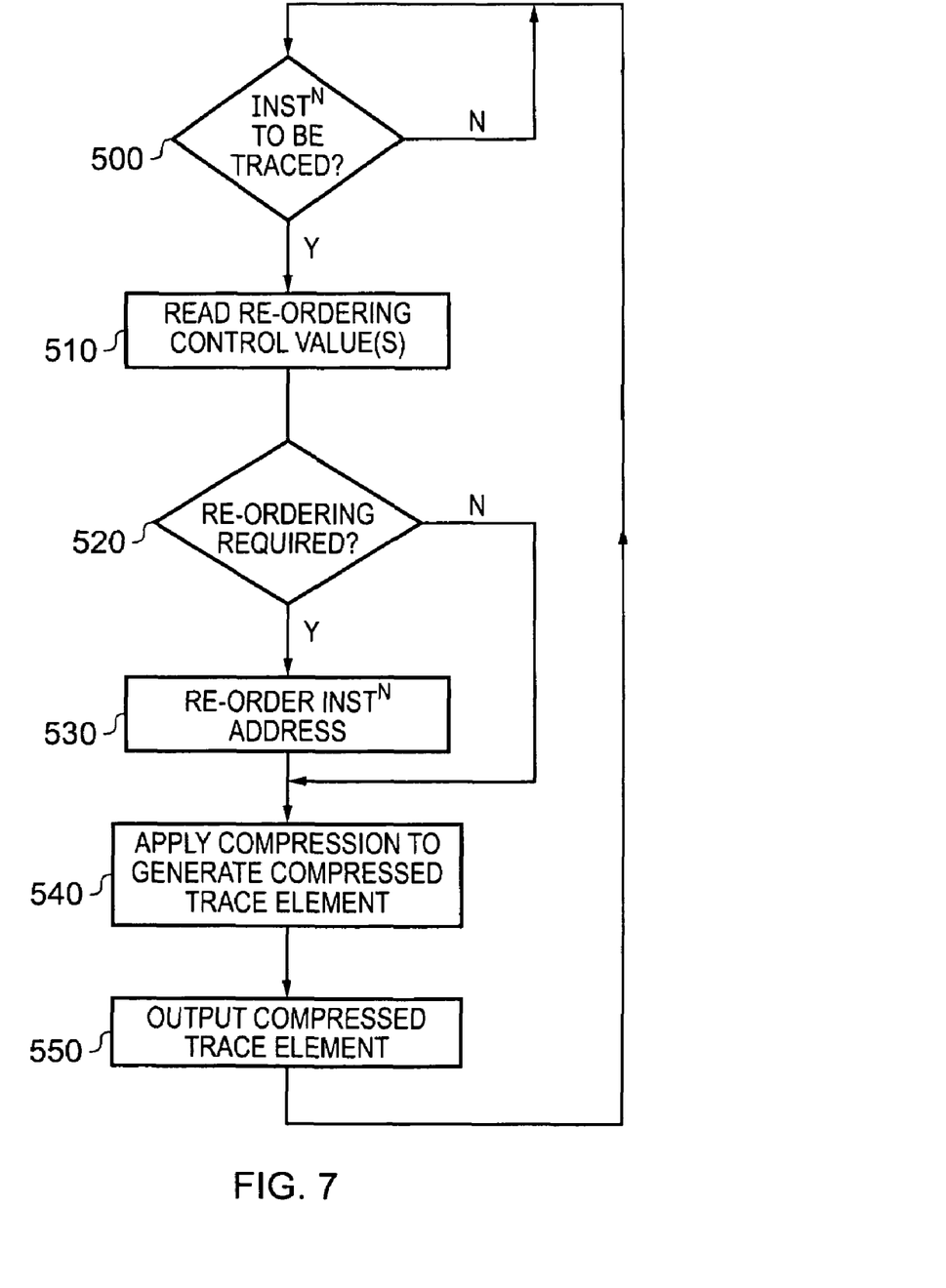
FIG. 7 is a flow diagram illustrating a sequence of steps performed by the trace generator in order to output a compressed trace element in accordance with one.

FIG. 7 is a flow diagram illustrating the steps performed by the trace generator 120 of FIG. 3 when performing the above-described compression process. At step 500, it is determined whether there is an instruction to be traced. As described earlier, in one embodiment these will either be the instructions at the target addresses of all branch instructions, or at least the instructions at the target addresses of any indirect branch instructions. If there is an instruction to be traced, then the process proceeds to step 510, where the re-ordering control values are read from the control register 140, and then at step 520 it is determined whether re-ordering is required. If so, the process proceeds to step 530, where the re-order logic 310 performs the required re-ordering of the instruction address, whereafter the process proceeds to step 540. Alternatively, the process proceeds directly to step 540 if no re-ordering is required. At step 540, the compression logic 320 applies a compression algorithm (which can be any of a number of known compression algorithms) to generate a compressed trace element, which is then output at step 550 in the trace stream. Thereafter, the process returns to step 500.

Figure 8:
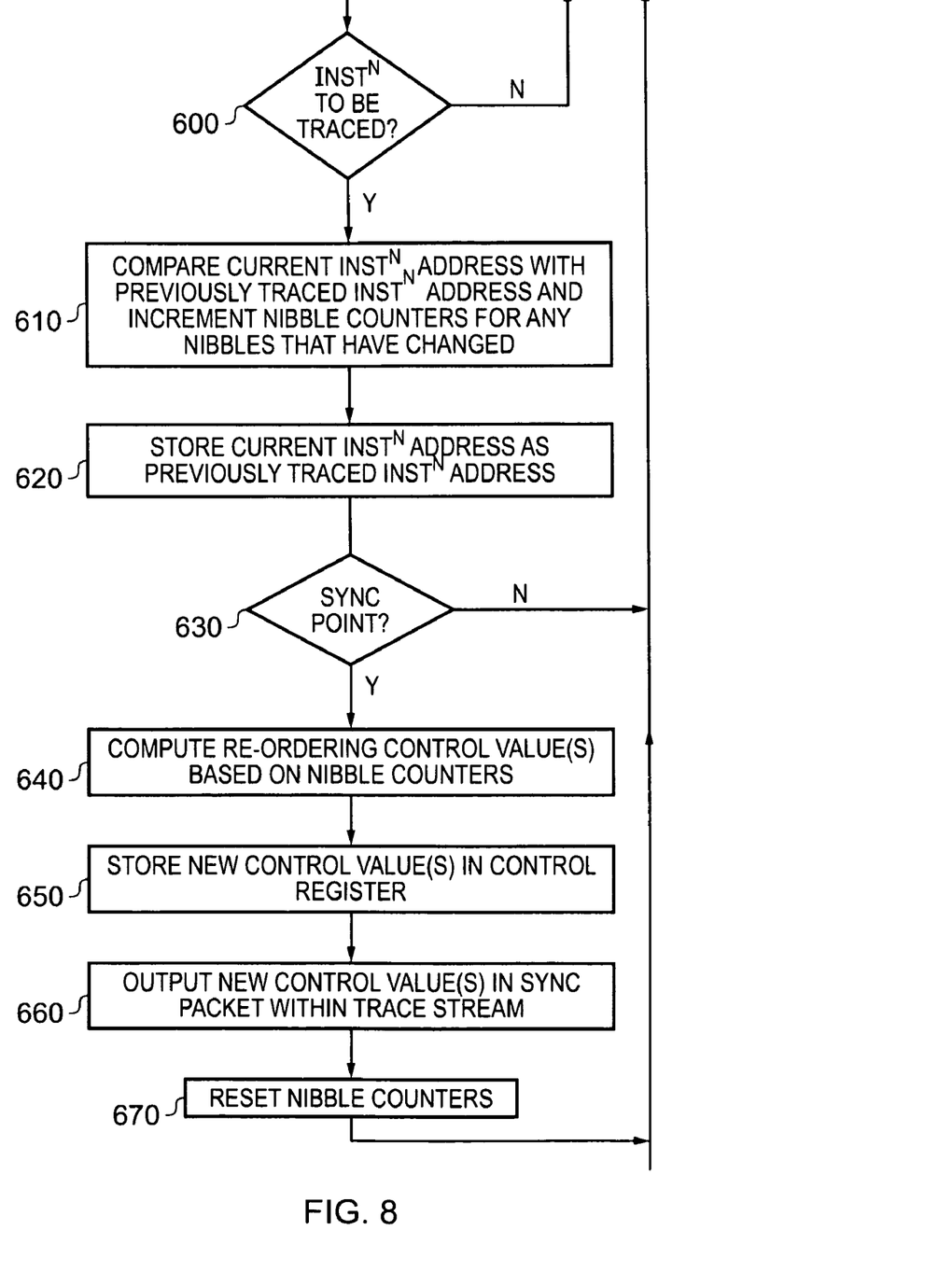
FIG. 8 is a flow diagram illustrating a profiling process and associated computation process for changing the re-ordering control values in accordance with one embodiment.

FIG. 8 is a flow diagram illustrating a profiling operation that may be performed by the trace generator 120 in order to enable a dynamic configuration of the re-ordering control values in the control register 140. Whenever it is determined at step 600 that there is an instruction to be traced, then at step 610 the current instruction address is compared with a previously traced instruction address (which is stored locally within the trace generator for this comparison process). The trace generator is also arranged to retain nibble counters for each of the nibbles of an instruction address, and based on this comparison increments the nibble counters for any nibbles that have changed. Hence, if nibbles 7, 2, 1 and 0 are different in the current instruction address when compared with the previously traced instruction address, then the nibble counters for nibbles 7, 2, 1 and 0 will be incremented at step 610. Thereafter, at step 620, the current instruction address is stored as the previously traced instruction address, so that it is available for the next iteration of the profiling process.

At step 630, it is determined whether a sync point has been reached. In accordance with the existing ETM protocol, a sync packet is periodically output in the trace stream providing sufficient information to enable trace analysis to start following the sync packet. Hence, even if a portion of a trace stream is lost, the trace analysis tool can still perform trace analysis once it has received and decoded a sync packet. If such a sync point has not been reached, then the process merely returns to step 600 to await the next instruction to be traced.

However, if a sync point is determined to have been reached at step 630, then at step 640 the trace generator 120 computes the re-ordering control values based on the current nibble counters. Thereafter, the new control values are stored in the control registers 140 at step 650, and in addition these new control values are output in the sync packet issued in the trace stream at step 660, so that that information can be extracted by the trace re-ordering logic 210 within the trace analyser 40, to cause the copy of the re-order control values in the register 220 to be updated. Thereafter, at step 670, the nibble counters are reset, and the process returns to step 600.

Figure 9:
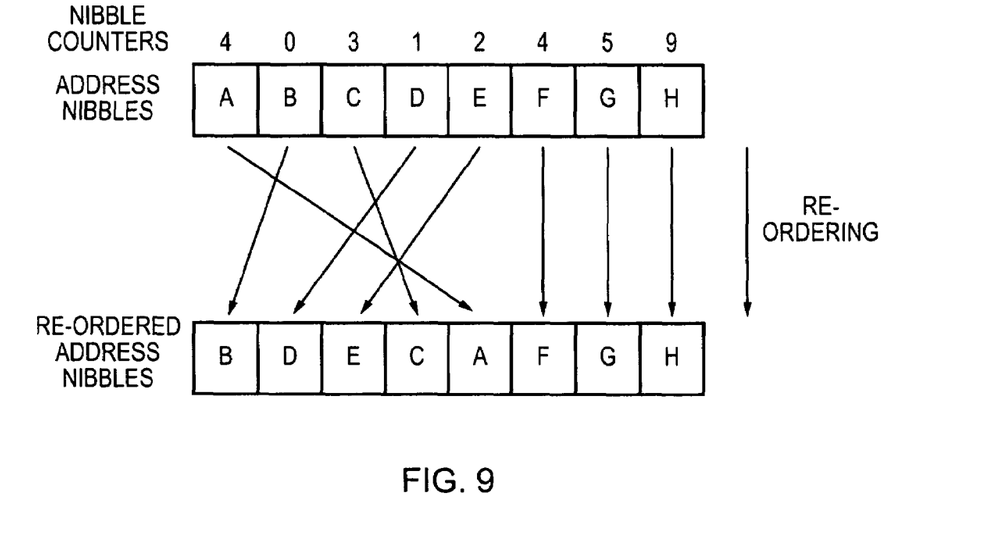
FIG. 9 is a diagram schematically illustrating an example re-ordering that can be achieved by employing techniques of embodiments.

FIG. 9 is a diagram schematically illustrating a re-ordering that may be computed at step 640 of FIG. 8 in accordance with the above described dynamic profiling technique. As shown in FIG. 9, it is assumed that the eight nibbles of the instruction address are labelled A, B, C, D, E, F, G, H, with A being the most significant nibble. Nibble counters are maintained by the trace generation logic 120 for each of the nibbles, and in the example of FIG. 9, at the time a sync point is reached, these nibble counters have the values 4, 0, 3, 1, 2, 4, 5, 9, respectively. When performing step 640, the trace generation logic re-orders the nibbles such that those nibbles having the highest counter values are placed at the least significant positions, and those nibbles having the lowest counter values are placed at the most significant positions, since this is most likely to achieve efficient compression using the earlier described compression techniques. Accordingly, for this example, it can be seen that the positions of nibbles F, G and H are unchanged, but nibble A is demoted to a lower significant position. Similarly, nibble C is demoted, and nibbles B, D and E are promoted to more significant positions.

By such an approach, the profiling process performed by the trace generator 120 inherently obtains information about the operating environment of the logic producing the data elements, or at least the part of the operating environment that is affecting good compression, and then can produce a re-ordering that will improve subsequent compression following the sync point at which the revised re-ordering control values are computed.

It will be appreciated that whilst the above described techniques have been described in the context of instruction tracing, such techniques can also be applied to other types of tracing, in particular data address tracing in situations where the efficiency of the compression achieved is sensitive to the operating environment of the logic producing the data elements. Further, in some embodiments, the techniques may be useful when performing data value tracing.

Through use of the above-described techniques of embodiments of the present invention, the requirements for trace bandwidth can be alleviated, which is a significant benefit, since trace bandwidth is expensive, either in terms of the requirement for trace pins, or the use of on-chip memory buffers.

As a specific example, in a nibble based system, with a nibble transmission order of 0, 1, 2, 3, 4, 5, 6, 7 (where nibble 7 is the most significant nibble), an example library function call in Linux (e.g. strcmp or memcpy) might result in a branch from 0x00001234 to 0x800015CC, requiring the transmission of nibbles C, C, 5, 1, 0, 0, 0 and 8. However, using the above described techniques of embodiments of the present invention, the re-order logic may change the nibble transmission order to 0, 1, 2, 7, 3, 4, 5, 6, which results in the required transmission of only four nibbles, namely C, C, 5 and 8 (assuming the address 0x00001234 is also traced).

Whilst in the above embodiments, the data elements have been considered to consist of a plurality of portions at a nibble level of granularity, it will be appreciated that the control registers 140 can configure the transmission order at a variety of granularities, for example byte, bit, nibble, etc.

As described above, a similar technique could be applied to data address tracing, for example to deal with back-to-back accesses to library and local variables. This could share the same control registers to define the control information, or indeed separate control registers could be provided to specify the re-ordering applicable to data address tracing.

Although particular example embodiments have been described herein, it will be apparent that the claims are not limited thereto, and that many modifications and additions may be made within the scope of the claims.

I claim:

1. A data processing apparatus, comprising:
   processing circuitry for producing data elements;
   trace circuitry for producing a stream of trace elements representative of at least some of said data elements, the trace circuitry having trace generation circuitry for generating trace elements for inclusion in the stream, the trace generation circuitry including compression circuitry for performing a compression process on at least some trace elements prior to inclusion in the stream; and
   storage associated with the trace circuitry for providing control information which is dependent on an operating environment of the processing circuitry producing said data elements, the trace generation circuitry being configured to reference said control information in order to adapt the compression process performed by the compression circuitry having regard to said operating environment.

2. A data processing apparatus as claimed in claim 1, wherein said compression circuitry comprises re-ordering circuitry which is, for at least a subset of data elements to be represented by trace elements, to consider each said data element as a series of portions and to re-order said portions dependent on the control information to produce a reordered data element, the trace element being formed by at least a part of the reordered data element, and the compression circuitry being configured to apply to the trace element a compression algorithm specified by said compression process.

3. A data processing apparatus as claimed in claim 1, wherein the operating environment upon which the control information depends is an operating system used by the processing circuitry producing the data elements, the control information providing a control value which is dependent on the operating system used.

4. A data processing apparatus as claimed in claim 1, wherein the control information is configurable from a source external to the trace circuitry, such that the source can program the control information.

5. A data processing apparatus as claimed in claim 4, wherein said source is trace analyzer circuitry for analyzing the stream of trace elements produced by the trace circuitry.

6. A data processing apparatus as claimed in claim 1, wherein the control information is configurable by the trace circuitry, the trace circuitry being configured to perform a trace analysis process and to re-calculate the control information at determined points dependent on a result of that trace analysis process.

7. A data processing apparatus as claimed in claim 6, wherein the trace analysis process is a trace profiling process which, for at least a subset of data elements to be represented by trace elements, logs information about which portions of a current data element to be traced differ from corresponding portions of a preceding data element that was traced.

8. A data processing apparatus as claimed in claim 6, wherein the determined points at which the trace circuitry re-calculates the control information are points where a sync packet is to be inserted in the trace stream, the trace circuitry being configured to provide an indication of the re-calculated control information in the sync packet.

9. A data processing apparatus as claimed in claim 2, wherein:
   at least some of said data elements are addresses and said trace circuitry is configured to produce a stream of trace elements representative of said addresses; and
   said at least a subset of data elements which the re-ordering circuitry produces reordered data elements for are addresses which cannot be implied by a previously issued address.

10. A data processing apparatus as claimed in claim 9, wherein said addresses are instruction addresses.

11. A data processing apparatus as claimed in claim 10, wherein said at least a subset of data elements which the re-ordering circuitry produces reordered data elements for are target addresses of at least some branch instructions.

12. A data processing apparatus as claimed in claim 2, wherein each portion of the data element comprises a byte, nibble or bit.

13. Trace logic circuitry for generating a stream of trace elements representative of at least some data elements produced by processing circuitry of a data processing apparatus, said trace circuitry comprising:

trace generation logic circuitry for generating trace elements for inclusion in the stream;

compression logic circuitry for performing a compression process on at least some trace elements prior to inclusion in the stream; and     control storage for controlling operation of the trace logic circuitry, the control storage providing control information which is dependent on an operating environment of the processing circuitry producing said data elements, the compression logic circuitry being configured to reference said control information in order to adapt the compression process performed having regard to said operating environment.

14. A trace analyzing apparatus for analyzing a stream of trace elements generated by a data processing apparatus as claimed in claim 1, comprising:

storage for storing current control information which is dependent on an operating environment of the processing circuitry producing said data elements; and     trace re-ordering logic circuitry configured on receipt of a compressed trace element in said stream to reference said current control information during a decompression process in order to determine the data element represented by that compressed trace element.

15. A method of operating a data processing system, comprising the steps of:

producing data elements;

employing trace logic circuitry to receive indications of said data elements, and to produce a stream of trace elements representative of at least some of said data elements;

providing information to control operation of the trace logic circuitry which is dependent on an operating environment of producing said data elements; and     performing a compression process on at least some trace elements prior to inclusion in the stream, during which said control information is referenced in order to adapt the compression process performed having regard to said operating environment.

16. A computer program product comprising a computer program stored in a tangible medium and operable to cause a computer to analyze a stream of trace elements generated by the method of claim 15 by performing the steps of:

storing current control information which is dependent on an operating environment of the processing circuitry producing said data elements; and     on receipt of a compressed trace element in said stream, referencing said current control information during a decompression process in order to determine the data element represented by that compressed trace element.

17. A data processing apparatus, comprising:

processing circuitry for producing data elements;

trace logic circuitry for producing a stream of trace elements representative of at least some of said data elements, the trace logic circuitry having trace generation logic circuitry for generating trace elements for inclusion in the stream, the trace generation logic circuitry including compression logic circuitry for performing a compression process on at least some trace elements prior to inclusion in the stream; and     storage associated with the trace logic circuitry for providing control information which is dependent on an operating environment of the processing circuitry producing said data elements, the trace generation logic circuitry being configured to reference said control information in order to adapt the compression process performed by the compression logic circuitry having regard to said operating environment;

said compression logic circuitry comprising re-ordering logic circuitry which is configured for at least a subset of data elements to be represented by trace elements, to consider each said data element as a series of portions and to re-order said portions dependent on the control information to produce a reordered data element, the trace element being formed by at lease a part of the reordered data element, and the compression logic circuitry being configured to apply to the trace element a compression algorithm specified by said compression process;

at least some of said data elements being instruction addresses and said trace logic circuitry being configured to produce a stream of trace elements representative of said instruction addresses; and     said at least a subset of data elements which the re-ordering logic circuitry produces reordered data elements for are instruction address which cannot be implied by previously issued instruction address;

wherein:

the operating environment upon which the control information depends is an operating system used by the processing circuitry producing the data elements, the control information providing a control value which is dependent on the operating system used; and     an operating system used by the processing producing the data elements uses an upper portion of the address to specify a type qualifier, and the re-ordering logic circuitry is configured to produce reordered data elements in which at least that upper portion is moved to a lower portion.

\* \* \* \* \*